US009064292B1

(12) United States Patent
Tidd

(10) Patent No.: US 9,064,292 B1
(45) **Date of Patent: *Jun. 23, 2015**

(54) SYSTEM FOR AND METHOD OF CLASSIFYING AND TRANSLATING GRAPHICS COMMANDS IN CLIENT-SERVER COMPUTING SYSTEMS

(75) Inventor: William Tidd, Alton Bay, NH (US)

(73) Assignee: hopTo, Inc., Campbell, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 13/399,793

(22) Filed: Feb. 17, 2012

Related U.S. Application Data

(63) Continuation-in-part of application No. 13/341,110, filed on Dec. 30, 2011.

(51) Int. Cl.
*G06T 1/00* (2006.01)

(52) U.S. Cl.
CPC ........................................ *G06T 1/00* (2013.01)

(58) Field of Classification Search
None
See application file for complete search history.

(56) References Cited

U.S. PATENT DOCUMENTS

| | | | | |
|---|---|---|---|---|
| 5,831,609 | A * | 11/1998 | London et al. | 715/746 |
| 6,578,197 | B1 | 6/2003 | Peercy et al. | |
| 6,747,642 | B1 * | 6/2004 | Yasumoto | 345/419 |
| 7,945,917 | B2 | 5/2011 | Shoji et al. | |
| 8,171,154 | B2 | 5/2012 | Vonog et al. | |
| 8,922,569 | B1 | 12/2014 | Tidd | |
| 2007/0169018 | A1 | 7/2007 | Coward | |
| 2008/0033940 | A1 * | 2/2008 | Dinh et al. | 707/6 |
| 2008/0201705 | A1 | 8/2008 | Wookey | |
| 2008/0316218 | A1 | 12/2008 | Kilani et al. | |
| 2009/0089453 | A1 * | 4/2009 | Bohan et al. | 709/246 |
| 2009/0189894 | A1 * | 7/2009 | Petrov et al. | 345/419 |
| 2010/0070951 | A1 | 3/2010 | Yamin | |
| 2010/0118039 | A1 | 5/2010 | Labour | |
| 2010/0328326 | A1 | 12/2010 | Hervas et al. | |
| 2011/0035758 | A1 | 2/2011 | Stoyanov et al. | |
| 2011/0055823 | A1 * | 3/2011 | Nichols et al. | 717/174 |
| 2011/0153824 | A1 * | 6/2011 | Chikando et al. | 709/226 |
| 2011/0157196 | A1 | 6/2011 | Nave et al. | |
| 2012/0011193 | A1 * | 1/2012 | Gilboa | 709/203 |
| 2012/0162198 | A1 | 6/2012 | Nakanishi et al. | |
| 2012/0254453 | A1 | 10/2012 | Lejeune et al. | |
| 2012/0331532 | A1 | 12/2012 | Walters et al. | |
| 2013/0124953 | A1 | 5/2013 | Fan et al. | |

OTHER PUBLICATIONS

U.S. Appl. No. 13/341,110, Office Action mailed Dec. 11, 2013.
U.S. Appl. No. 13/341,179, Office Action mailed Oct. 29, 2013.
U.S. Appl. No. 13/399,806, Office Action mailed Oct. 4, 2013.
U.S. Appl. No. 13/341,198, Office Action mailed Dec. 5, 2013.

(Continued)

*Primary Examiner* — Daniel Hajnik
*Assistant Examiner* — Patrick F Valdez
(74) *Attorney, Agent, or Firm* — Lewis Roca Rothgerber LLP

(57) ABSTRACT

A client-server computing system includes a server that has a virtual display driver that classifies and, if necessary, translates graphics application programming interface (API) functions to a cross-platform format. Classification involves determining whether the graphics command(s) are platform-specific and/or client-supported functions. After classification and translation, the graphics command(s) are marshaled and transmitted to a client via a network. The client includes a client display driver that executes the functions using a client 3D library and renders the resulting image data to a display.

15 Claims, 2 Drawing Sheets

(56) References Cited

OTHER PUBLICATIONS

U.S. Appl. No. 13/399,852, Office Action mailed Oct. 21, 2013.
U.S. Appl. No. 13/341,179, Final Office Action mailed Jun. 16, 2014.
U.S. Appl. No. 13/399,806, Final Office Action mailed May 23, 2014.
U.S. Appl. No. 13/341,198, Final Office Action mailed Jun. 11, 2014.
U.S. Appl. No. 13/399,852, Final Office Action mailed May 27, 2014.
U.S. Appl. No. 13/341,110, Final Office Action mailed Aug. 4, 2014.
U.S. Appl. No. 13/399,852, Office Action mailed Dec. 31, 2014.
U.S. Appl. No. 13/341,198, Office Action mailed Apr. 8, 2015.

* cited by examiner

SYSTEM FOR AND METHOD OF CLASSIFYING AND TRANSLATING GRAPHICS COMMANDS IN CLIENT-SERVER COMPUTING SYSTEMS

RELATED APPLICATIONS

This application is a continuation-in-part of U.S. patent application Ser. No. 13/341,110, filed Dec. 30, 2011, the entirety of which is incorporated by reference herein.

TECHNICAL FIELD

The present disclosure relates generally to graphics command processing in client-server computing systems, and more particularly to a system for and method of classifying and translating graphics commands in client-server computing systems.

BACKGROUND

In a client-server computing system, a computer application or program that is running on one computer (i.e., the server) may be accessible to another computer (i.e., the client) over a network, such as over the Internet. The user interface running on the server is exposed and visible to the client. In this way, the client has remote access to the server and the user of the client device can interact with the application that is running on the server.

The server application may be, for example, an application that processes two-dimensional (2D) and/or three-dimensional (3D) graphics. In this example, a 2D and/or 3D graphics application may be used to render graphical objects on a computer display. Currently, in a client-server computing system, the high-level graphics representation (e.g., Direct3D, OpenGL) is reduced to an image (e.g., a bitmap image) at the server. The image is then transmitted from the server to the client over the network. Once received at the client, the image is rendered on the client display. Creating, compressing, and transmitting these image files may result in high CPU utilization (i.e., computing load) at the server, especially when the application displays objects in motion and when there are a large number of remote users sharing the server. Further, images are often large and, therefore, transmitting images to a large number of remote users consumes a large amount of network bandwidth.

BRIEF DESCRIPTION OF THE DRAWINGS

Various inventive embodiments disclosed herein, both as to its organization and manner of operation, together with further objectives and advantages, may be best understood by reference to the following description, taken in connection with the accompanying drawings as set forth below.

DETAILED DESCRIPTION

The disclosure provides a client-server computing system that enables remote access to 3D graphics applications and methods of classifying and translating graphics commands such that graphic objects may be efficient displayed on a computer (client) located remotely from a computer (server) that is running the 3D graphics application, regardless of whether the client and the server operate on different computing platforms. The client-server computing system of the disclosure exhibits numerous advantages over existing systems. In various embodiments, the client-server computing system of the disclosure and associated methods may enable a server to provide 3D graphics application capabilities to a large number of clients while avoiding excessive computing load at the server. Further, client-server computing system of the disclosure may provide such 3D graphics application capabilities at lower network bandwidth requirements. Further still, the client-server computing system of the disclosure may be configured such that clients operating on different platforms can achieve these advantages.

Figure 1:
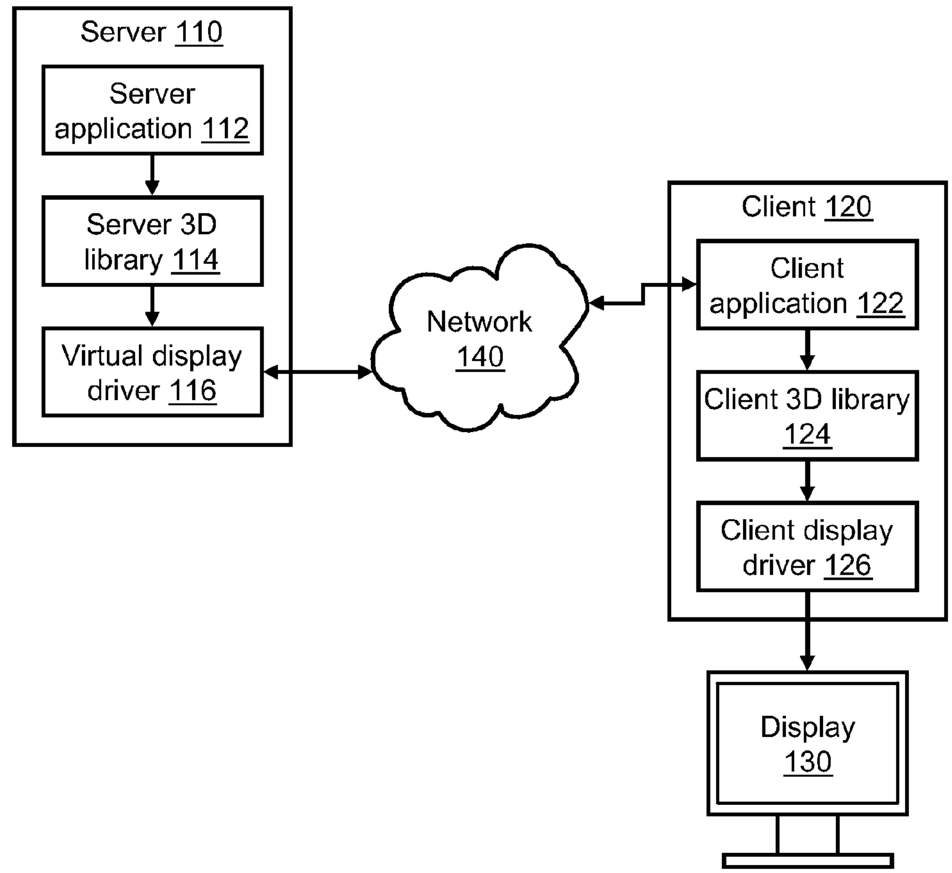
FIG. 1 illustrates a block diagram of a client-server computing system for providing cross-platform remote access to 3D graphics applications, according to the present disclosure.

FIG. 1 illustrates a block diagram of a client-server computing system 100 for providing cross-platform remote access to 3D graphics applications. Client-server computing system 100 includes a server 110 that is operatively connected to a client 120 and a display 130 via a network 140. Network 140 may be, for example, a local area network (LAN) and/or a wide area network (WAN) for connecting to the Internet. Entities of client-server computing system 100 may connect to network 140 by any wired and/or wireless means.

While client 120 and display 130 are illustrated as separate physical components (e.g., illustrative of a common implementation of a desktop or a workstation computing system such as clients running natively on Windows, Linux, UNIX, and Mac OS X operating system), the capabilities of such separate components can also be integrated in a single device (e.g., a mobile device or a tablet computer). For example, the mobile device can be an iPad tablet computer on the iOS operating system (Apple Inc., Cupertino, Calif.), or other mobile client on either the Android operating system (Google Inc., Mountain View, Calif.) or the Windows CE operating system (Microsoft Corp., Redmond, Wash.). Thus, as used herein, the terms "client" or "client computer" should be understood to include any such implementations.

Server 110 includes a server application 112, a server 3D library 114, and a virtual display driver 116 that, in accordance with the client-server model of computing, collectively function to enable server 110 to provide various resources or services to client 120, which may be located remotely from the server. In accordance with the present disclosure, these resources or services pertain to computer graphics.

Client 120 includes a client application 122, a client 3D library 124, and a client display driver 126. Collectively, these elements function to enable the client and the client user to consume computer graphics resources or services provided by server 110.

Server application 112 represents an application executing (i.e., "running") on server 110. The functionality of server application 112 shall be visible to and accessible by client 120 via network 140. For example, server application 112 may be a computer-aided design (CAD) application, such as AutoCAD (Autodesk, Inc., San Rafael, Calif., USA) or Cadence Virtuoso (Cadence Design Systems, San Jose, Calif.); a medical clinical workflow application such as Symbia.net (Siemens AG, Munich, Germany); an interactive mapping application such as Google Earth (Google, Inc.); or a 3D game. The functionality of server application 112 shall be visible to and accessible by client 120 via network 140. For example, the functionality of server application 112 may be accessed from client 120 using a process herein known as application publishing, which is currently supported by products such as GraphOn GO-Global, Microsoft Remote Desktop Services, and Citrix XenApp. Such application publishing may be performed in accordance with teachings of commonly-owned U.S. Pat. No. 5,831,609, filed Jun. 6, 1995, entitled "Method and system for dynamic translation between different graphical user interface systems," which is incorporated by reference as though fully set forth herein.

Client application 122 represents an application installed on and executing on client 120 that emulates a user interface of server application 112. For example, the client application may run in a browser and be implemented in a scripting language such as JavaScript, a multimedia platform such as Adobe Flash, or as a browser add-on (e.g., ActiveX control for Internet Explorer). Additionally, client application 122 may run as a standalone application. Client application 122 may receive various input commands from the user via an input device (not shown in FIG. 1), then transmit these commands to server 110, and update the user interface of client application 122 in response to computer graphics commands transmitted from server 110 back to client 120 over network 140.

Server 3D library 114 and client 3D library 124 provide a set of interfaces or graphics functions to server 110 and client 120, respectively. These components are also referred to herein as a high-level graphics language or a graphics application programming interface (API). In one embodiment of the disclosure, both server 3D library 114 and client 3D library 124 support and same graphics API. For example, both libraries may be based on the OpenGL API (Khronos Group, Beaverton, Oreg.), Direct3D API (Microsoft Corp, Redmond, Wash.), or other 3D graphics API of conventional or novel design.

In one aspect of this disclosure, server 3D library 114 and/or client 3D library 124 can include 3D graphics API functions that provide native support to the specific operating system utilized by server 110 and/or client 120. For example, if client 110 operates on the X Window System (i.e., X11) platform and client 3D library 124 utilizes the OpenGL language, client 3D library 124 can further include the GLX (i.e., OpenGL Extension to the X Window System) API or the GLUT (i.e., OpenGL Utility ToolKit) library. This means that certain functions are platform-specific; that is, certain functions in server 3D library 114 may be executable only by server 110 and certain functions in client 3D library 124 may be executable only by client 120. Certain inventive aspects of this disclosure are directed towards translating platform-specific functions into cross-platform or client-supported functions.

Virtual display driver 116 is a software code module that enables commands or functions that are called in server 3D library 114 to be marshaled (i.e., encoded) and transmitted to client 120 over network 140. Marshaling (or marshalling) is the process of transforming the memory representation of such commands to a data format suitable for transmission via network 140. For example, virtual display driver 116 assigns an ID to each graphics function and converts function arguments from a platform-specific byte order into a common byte order that all clients can read, regardless of the native byte order of the client device. This encoding allows graphic objects and their motions to be represented much more efficiently than the conventional method of generating an image for each arrangement or view of the objects. Significantly less data must be compressed and transmitted by the server, greatly reducing CPU usage on the server and network bandwidth usage.

Client display driver 126 includes a software code module that receives marshaled data from server 110 via client application 122 and executes the 3D library functions using client 3D library 124. This enables client 120 to handle intensive graphics rendering operations, such as blending or shading, while enabling server 110 to share server application 112 with a large pool of clients. This also reduces the bandwidth requirements of network 140 as pixel array image data (e.g., in the form of Bitmap image files) no longer needs to be transmitted from server 110 to individual clients, such as client 120, as was the case in conventional client-server computing systems.

In operation, client 120 connects to server 110 via network 140 by suitable connection of either conventional or novel design (e.g., Transmission Control Protocol/Internet Protocol model). Optionally, client 120 may transmit capability information to server 110, such as information about the particular APIs supported by client display driver 126. Server 110 may forward such information to virtual display driver 116 for later use. Client 120 then initializes server application 112 on server 110 (e.g., initialize various startup instructions of the AutoCAD application) and issues a graphics request to server application 112 (e.g., draw 3D cube). Server application 112 loads and initializes server 3D library 114 Then server 3D library 114 queries virtual display driver 116 to determine its capabilities. Virtual display driver 116 generally returns the capabilities of client 120, but may also return capabilities that are not support by client 120 but are supported by virtual display driver 116. Server application 112 calls or invokes the appropriate function or functions (i.e., graphics command(s)) in server 3D library 114 that satisfy the client request. Server 3D library 114 receives the call made by server application 112 and executes the function by calling or invoking virtual display driver 116. According to one inventive aspect of the disclosure, virtual display driver 116 classifies and, if necessary, translates the commands such that they can be executed by client 120 regardless of whether client 120 operates on a different platform or utilizes a different native 3D graphics API than server 110. Then, virtual display driver 116 encodes and transmits the commands to client 120. Client 120 decodes the commands and executes each command by making calls to client 3D library 124. In turn, client 3D library 124 calls client display driver 126 with the resulting pixel image array data and client display driver 126 renders image(s) to display 130.

Figure 2:
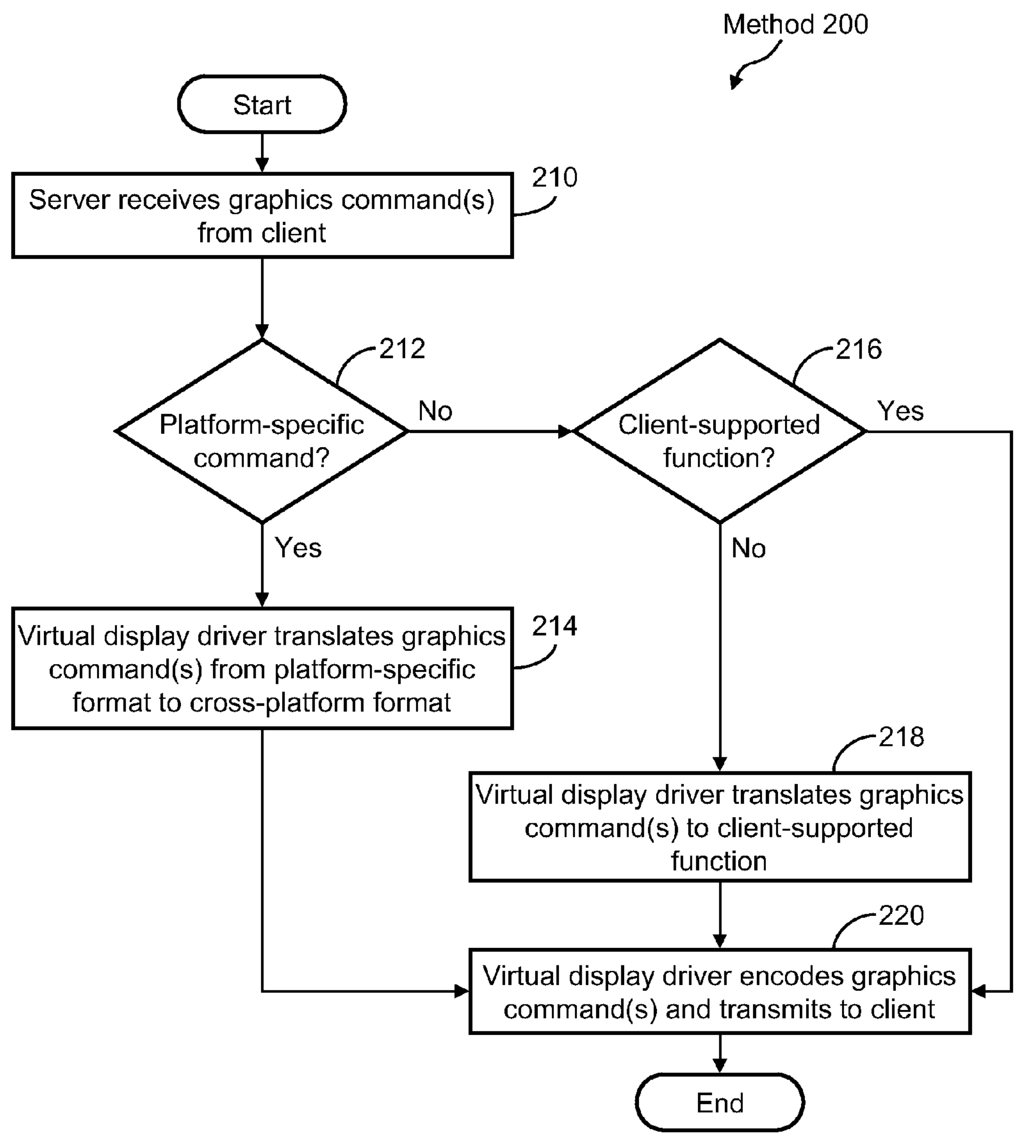
FIG. 2 illustrates a flow diagram of a method of classifying and translating graphics commands on a server in a client-server computing system, according to the present disclosure.

FIG. 2 illustrates a flow diagram of a method 200 of classifying and translating graphics commands on a server in a client-server computing system. Method 200 may be performed using virtual display driver 116 of server 110 of client-server computing system 100. That is, virtual display driver 116 may be used to classify and, if necessary, translate graphics command(s) before transmission to client 120. Method 200 may include, but is not limited to, the following steps.

At a step 210, virtual display driver 116 of server 110 receives one or more graphics command(s) from client 120 via network 140 as described either herein above or by any other means.

At a decision step 212, virtual display driver 116 of server 110 determines whether the graphics command(s) are specific to the platform on which client 120 is operating. This determination is a form of platform classification for graphics commands. According to one embodiment, the classification is a binary or "hard" decision—either the graphics command(s) are platform-specific or cross-platform. For example, virtual display driver 116 can contain predetermined logic that any OpenGL call that is specific to WGL (e.g., wglCopyContext) is a platform-specific call. WGL is a windowing system interface to the Microsoft Windows implementation of OpenGL. By way of another example, glXCreateGLXPixmap is an OpenGL call that is specific to the X Window System platform. This classification may be made by accessing data structures that maintain attributes of specific graphics commands, or it may be made implicitly in code that is specific to a given graphics command. If virtual display driver 116 determines that the graphics command is platform-specific, method 200 proceeds to a step 214. However, if the search indicates that the graphics command is not platform-specific, method 200 proceeds to a step 216.

At a step 214, having determined that the graphics command(s) are platform-specific function(s), virtual display driver 116 of server 110 translates the graphics command(s) from a platform-specific format to a cross-platform format. This translation represents an abstraction of the description of the graphics command(s), such that the abstraction can be understood and implemented on any collection of computing platforms, namely the collection of potential platforms on which client 120 operates.

For example, step 214 can involve a translation of the concrete, platform-specific command to a more abstract data type that is platform-independent and can be executed on client 120 regardless of its platform. For example, if the call is wglCopyContext, it may be translated to an abstract command (e.g., abstractCopyContext) that can be implemented on other client platforms. In this example, when client 120 operates on an X11 platform, client 120 translates abstractCopyContext to glXCopyContext; alternatively, when client 120 operates on a Windows platform, client 120 translates abstractCopyContext to wglCopyContext. Alternatively, step 214 may involve a translation of the command to an equivalent function that is supported by client 3D library 124 of client 120. For example, if client 120 operates on an X11 platform, virtual display driver 116 may convert wglCopyContext to glXCopyContext. As yet another alternative, virtual display driver 116 may convert a platform-specific command to a cross-platform alternative. One such example of a cross-platform graphics API is the OpenGL Utility Toolkit (GLUT). For example, if the call is CreateWindow, a GLUT function that could be executed by client 120 to achieve the same command functionality regardless of platform could be glutCreateWindow.

At a decision step 216, having determined that the graphics command(s) are not platform-specific at step 212, virtual display driver 116 of server 110 determines whether the graphics command(s) are client-supported functions. This determination is a form of version classification for graphics commands. According to one embodiment, the classification is a binary or "hard" decision—either the function is supported by client 120 or it is not. One example of a scenario in which the graphics command(s) may be considered cross-platform but not client-supported functions arises when server 110 and client 120 operate on the same platform, server 3D library 114 and client 3D library 124 include different versions of a 3D graphics API specific to the platform, and a graphics command called in server 3D library 114 is not included in the version of client 3D library 124. To compute this classification, virtual display driver 116 may utilize capability information transmitted from client 120 to server 110, which might include the API version or versions supported in client 3D library 124.

If both client 120 and virtual display driver 116 do not support a given capability, at the time when server 3D library 114 calls virtual display driver 116 to determine its capabilities, virtual display driver 116 reports that it does not support the capability. In this case, server 3D library 114 forwards graphics commands to virtual display driver 116 that client 120 supports and method 200 proceeds to a step 220.

However, if client 120 does not support a given capability but virtual display driver 116 supports the capability, at the time when server 3D library 114 calls virtual display driver 116 to determine its capabilities, virtual display driver 116 reports that it supports the capability. In this case, server 3D library 114 may forward graphics commands to virtual display driver 116 that client 120 does not support and method 200 proceeds to a step 218.

At a step 218, having determined that the graphics command(s) are not client-supported functions at step 216, either virtual display driver 116 of server 110 or client 120 translates the graphics command(s) functions that are supported by client 3D library 124. For example, if client 3D library 124 supports OpenGL version 2.2 and server 3D library 114 supports OpenGL version 3.0, but client 120 supports the GL_ARB_vertex_array_object extension (which is not supported in OpenGL version 2.2), virtual display driver 116 forwards GL_ARB_vertex_array_object commands to client 120, and client 120 translates the commands to APIs that are supported by client 3D library 124.

At a step 220, virtual display driver 116 of server 110 encodes each of the received graphics command(s) and transmits the information to client 120 via network 140. As described herein above, virtual display driver 116 may utilize marshaling to transform the memory representation of such commands to a data format suitable for transmission via network 140.

Various embodiments of the present disclosure allow for the functionality of this disclosure to be performed by an intermediary device, such as a cloud server (not shown), which may be associated with the server 110 and client 120, or reside elsewhere in the network (e.g., in the cloud). For example, while client 120 is interacting with server 110, some of the methods described herein may be offloaded to the cloud server to be performed. Additionally, the cloud server may be used to facilitate interaction between individual or multiple clients and server 110 by performing protocol and/or graphics conversions as described herein.

I claim:

1. A cloud-based computing system for classifying and translating graphics commands, the server computing system comprising:

a client and a server operatively connected through a network wherein the server comprises a server application, and a cloud server operatively coupled to the client and the server through a network, the cloud server hosting a functionality for making the server application visible to and accessible by the client;

the server further configured to:

receive a graphics command request regarding the server application from the cloud server, the graphics command request originated by the remote client;

determine whether the requested graphics command of the server application is a platform-specific command based on comparison to stored data regarding attributes of a plurality of different graphics commands;

if the requested graphics command is determined to be a platform-specific command, then:

translating the requested graphics command into a cross-platform format graphics command by creating an abstraction of the description of the graphics command, such that the abstraction can be understood and implemented on any collection of computing platforms, encoding the cross-platform format graphics command, and transmitting the encoded command to the cloud server for transmission to the remote client;

if the requested graphics command is determined not to be a platform-specific command, then determining whether the requested graphics command is in a format supported by the remote client based on comparison to a client library of the remote client and by utilizing capability information transmitted from the client to the server;

if the requested graphics command is in a format supported by the remote client, then encoding the cross-platform format graphics command, and transmitting the encoded command to the cloud server for transmission to the remote client; and if the requested graphics command is not in a format supported by the remote client, then translating the requested graphics command into a format supported by the remote client, encoding the cross-platform format graphics command, and transmitting the encoded command to the cloud server for transmissions to the remote client.

2. The system of claim 1, wherein the client comprises a client library and wherein the server comprises a server library.

3. The system of claim 2, wherein the client library and the server library are associated with different platforms.

4. The system of claim 2, wherein the client library and the server library are associated with a same platform, and wherein the client library supports different commands from the server library.

5. The system of claim 2, wherein the cloud server further comprises a virtual display driver that supports one or more capabilities not found in the client.

6. The system of claim 1, wherein the client receives one or more input commands from a user, and further comprising determining whether the one or more input commands are to be handled by the client or by the server.

7. The system of claim 6, wherein the determination of where the one or more input commands are to be handled is based on the client handling supportable graphics commands.

8. A cloud-based computing method for classifying and translating graphics commands, the method comprising:

receiving a graphics command request from a cloud server over the communications network, the graphics command request originated by a remote client;

determining whether the requested graphics command is a platform-specific command based on comparison to stored data regarding attributes of a plurality of different graphics commands;

if the requested graphics command is determined to be a platform-specific command, then:

translating the requested graphics command into a cross-platform format graphics command by creating an abstraction of the description of the graphics command, such that the abstraction can be understood and implemented on any collection of computing platforms, encoding the cross-platform format graphics command, and transmitting the encoded command to the cloud server for transmission to the remote client;

if the requested graphics command is determined not to be a platform-specific command, then determining whether the requested graphics command is in a format supported by the remote client based on comparison to a client library of the remote client and by utilizing capability information transmitted from the client to the server;

if the requested graphics command is in a format supported by the remote client, then encoding the cross-platform format graphics command, and transmitting the encoded command to the cloud server for transmission to the remote client; and if the requested graphics command is not in a format supported by the remote client, then translating the requested graphics command into a format supported by the remote client, encoding the cross-platform format graphics command, and transmitting the encoded command to the cloud server for transmissions to the remote client.

9. The method of claim 8, wherein the server comprises a server library.

10. The method of claim 9, wherein the client library and the server library are associated with different platforms.

11. The method of claim 9, wherein the client library and the server library are associated with a same platform, and wherein the client library supports different commands from the server library.

12. The method of claim 9, wherein the cloud server further comprises a virtual display driver that supports one or more capabilities not found in the client.

13. The method of claim 9, wherein the client receives one or more input commands from a user, and further comprising determining whether the one or more input commands are to be handled by the client or by the server.

14. The method of claim 13, wherein the determination of where the one or more input commands are to be handled is based on the client handling supportable graphics commands.

15. A non-transitory computer-readable storage medium, having embodied thereon a program executable by a processor to perform a cloud-based computing method for classifying and translating graphics commands, the method comprising:

receiving a graphics command request from a cloud server over the communications network, the graphics command request originated by a remote client;

determining whether the requested graphics command is a platform-specific command based on comparison to stored data regarding attributes of a plurality of different graphics commands;

if the requested graphics command is determined to be a platform-specific command, then:

translating the requested graphics command into a cross-platform format graphics command by creating an abstraction of the description of the graphics command, such that the abstraction can be understood and implemented on any collection of computing platforms, encoding the cross-platform format graphics command, and transmitting the encoded command to the cloud server for transmission to the remote client;

if the requested graphics command is determined not to be a platform-specific command, then determining whether the requested graphics command is in a format supported by the remote client based on comparison to a client library of the remote client and by utilizing capability information transmitted from the client to the server;

if the requested graphics command is in a format supported by the remote client, then encoding the cross-platform format graphics command, and transmitting the encoded command to the cloud server for transmission to the remote client; and if the requested graphics command is not in a format supported by the remote client, then translating the requested graphics command into a format supported by the remote client, encoding the cross-platform format graphics command, and transmitting the encoded command to the cloud server for transmissions to the remote client.

* * * * *